United States Patent
Gomez et al.

(10) Patent No.: US 6,950,781 B2
(45) Date of Patent: Sep. 27, 2005

(54) METHOD OF CALCULATING DEVICE METRICS

(75) Inventors: Rudolph J. Gomez, Fremont, CA (US); Peter M. Piet, Orinda, CA (US); Kip M. Farmer, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/458,435

(22) Filed: Jun. 9, 2003

(65) Prior Publication Data

US 2004/0249602 A1 Dec. 9, 2004

(51) Int. Cl.⁷ .............................................. G06F 11/30
(52) U.S. Cl. ............................... 702/183; 714/47
(58) Field of Search .................. 702/34–36, 81–84, 702/179, 181, 182, 183–187, 58, 90; 714/26, 41, 47, 48, 35; 701/14, 29, 30

(56) References Cited

U.S. PATENT DOCUMENTS

| | | | | |
|---|---|---|---|---|
| 5,210,704 A | * | 5/1993 | Husseiny | 702/34 |
| 6,675,129 B1 | * | 1/2004 | Cambon et al. | 702/182 |
| 6,684,349 B2 | * | 1/2004 | Gullo et al. | 714/47 |

OTHER PUBLICATIONS

Huaiquing Wu, et al.; "Early Detection of Reliability Problems Using Information From Warranty Databases"; Mar. 23. 2001; Iowa State University, Department of Statistics; pp. 1–28.

* cited by examiner

*Primary Examiner*—Hal Wachsman
*Assistant Examiner*—Mohamed Charioui

(57) ABSTRACT

A method and system of calculating device metric is disclosed. In accordance with one embodiment, life-cycle data for devices are acquired; then, the devices are qualified based on the completeness and consistency of the data for calculating the metric. The metric is then calculated using the qualified devices data.

23 Claims, 4 Drawing Sheets

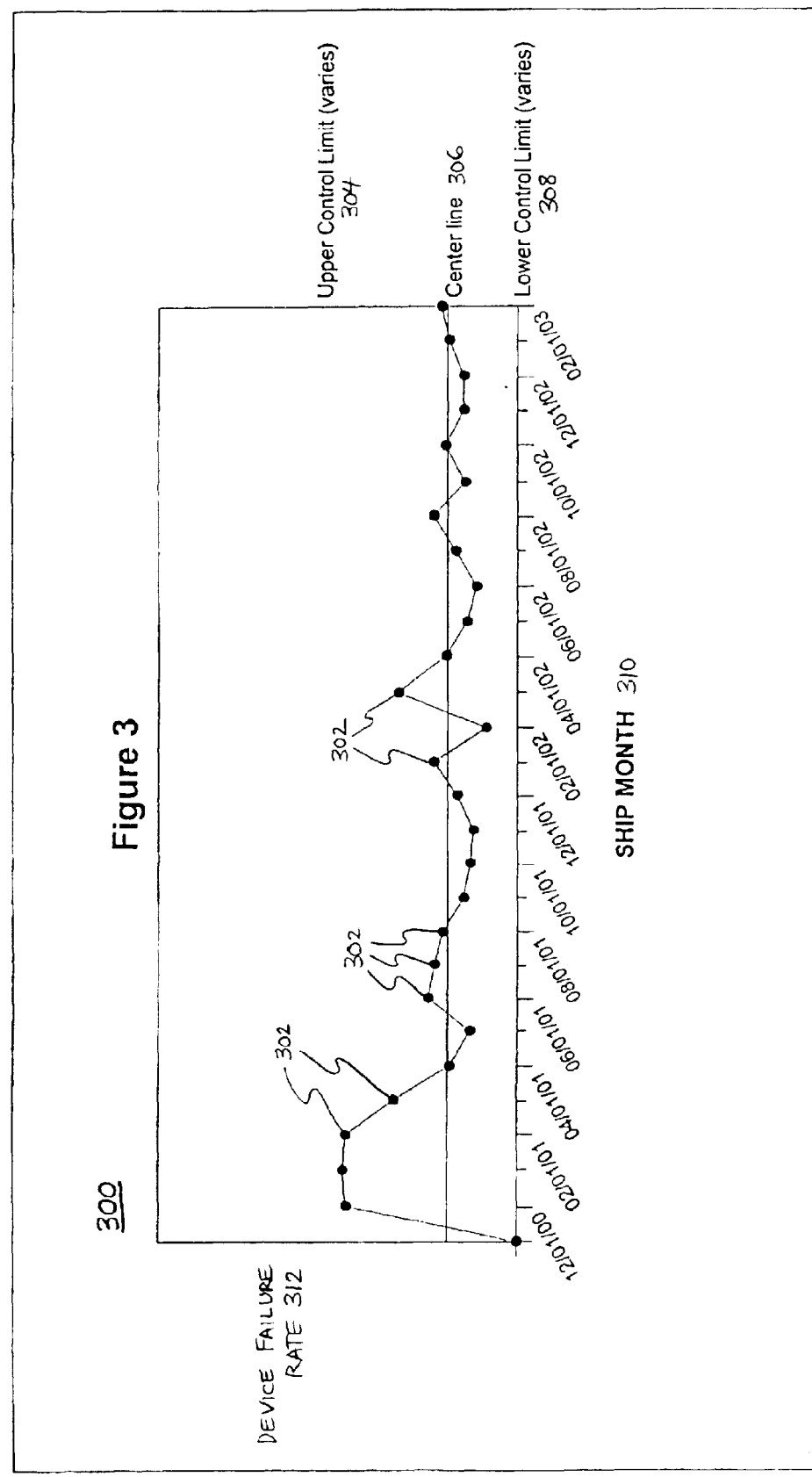

METHOD OF CALCULATING DEVICE METRICS

TECHNICAL FIELD

Embodiments of the present invention relate to a method and system of calculating device metrics.

BACKGROUND ART

Device metrics is of interest because the metrics provide useful information on how a device is performing as it ages. A device metric is any statistic that characterizes the device during its field life-cycle. Examples of device metrics include device failure rate, defect rate, warranty claims, return rates and life expectancy.

In the conventional art, one way in which device metrics are calculated is by using warranty data. However, a problem with using warranty data is that since the data is amorphous and does not distinguish devices on the basis of their life-cycle characteristics, the metric is not accurate. For example, the warranty approach to device metrics typically does not factor-in the actual date the device is turned-on nor does it calculate the actual hours of operation.

Thus, for accurate metrics it is necessary to qualify a device, as described herein, before its data is accepted in the calculations. Qualifying a device involves verifying that the device satisfies specified life-cycle criteria such that inclusion of its data in the calculation will not introduce inaccuracy in the metric. In the above example, if the device is in a class of devices having the same shipment month then metrics computed for this group of units would require a life cycle event that indicates the device is in operation in the field as the starting point for calculating the actual hours of operation of each device in the group. It should be noted that a device can be qualified on the basis of any of its life-cycle characteristics.

In the conventional art there is no known method or system that qualifies a device in the manner as described herein prior to using the data to calculate metrics. Thus, in a conventional art wherein warranty-based data was used, and wherein the devices were not qualified, the following disadvantages were noted: no ability to characterize the device reliability as a function of the device age; no ability to clearly trace high device failure rate estimates directly back to the time period during which the device was shipped and installed; no ability to make clear decisions pertaining to the device based on sound statistical quality control principles; less accuracy in the metric because of the assumption in the data that all units shipped in a month were installed on the first day of the next month; less accuracy in the metric because all repairs reported are posted to the current reporting month regardless of when the repairs occurred; the warranty data included repairs even when the device serial number cannot be validated with a manufacturing shipment record; the warranty data did not provided visibility to out-of-warranty devices; and the system did not use statistical control techniques to evaluate and report the metric.

Similar disadvantages are anticipated with other conventional methods and systems that do not qualify a device prior to using the data in the calculations.

Accordingly, in view of disadvantages of conventional methods, it is an objective of the present invention to provide for a more accurate way to calculate and report device metrics. These and other objectives of the present invention will no doubt become obvious to those of ordinary skill in the art on reading the following detailed description of preferred embodiments in conjunction with the various Figures.

DISCLOSURE OF THE INVENTION

A method and system of calculating a device metric is disclosed. In accordance with one embodiment, life-cycle data for the devices are acquired; then, the devices are qualified based on the completeness and consistency of the data for calculating the metric. The metric is then calculated using the qualified devices data.

BRIEF DESCRIPTION OF THE DRAWINGS

FIG. 3 is an example of a Quality Control Chart depicting a metric calculated in accordance with an embodiment of the present invention.

BEST MODE FOR CARRYING OUT THE INVENTION

In overview, embodiments of the present invention are concerned with a method and system of calculating device metrics. In one embodiment, life-cycle data for a device is acquired to calculate the metric. The data is filtered and completeness and data consistency checks are applied to the data. Devices which fail these tests are temporarily set aside and excluded from metric processing until clarifying information is received and processed. If the device passes these checks then a device data quality indicator is assigned and device data is ready for usage in calculating metrics of interest.

Reference will now be made in detail to embodiments of the present invention, examples of which are illustrated in the accompanying FIGS. While the invention will be described in conjunction with preferred embodiments, it will be understood that the description is not intended to limit the invention to these embodiments. On the contrary, the invention is intended to cover alternatives, modifications and equivalents which may be included within the spirit and scope of the invention as defined by the appended claims.

In the following description where necessary, specific details are set forth in order to provide a thorough understanding of the invention. However, it will be appreciated by one ordinarily skilled in the art that the invention may be practiced without these specific details. However, where the description entails well known methods, procedures and mathematical approaches, a detailed description is not provide so as to avoid unnecessarily obscuring aspects of the invention.

Also, in the following description, terms pertaining to procedures, steps, logic blocks, processing, and other symbolic representations of operations on data bits that can be performed on computer memory, are used. A procedure, computer executed step, logic block, process, etc., is here, and generally, conceived to be a self-consistent sequence of steps or instructions leading to a desired result. The steps are those requiring physical manipulations of physical quantities in a computer system. It should be noted that all of these and similar terms are to be associated with the appropriate physical quantities and are merely convenient labels applied to these quantities. Unless specifically stated otherwise, in following description terms such as "acquiring," or "qualifying," or "calculating," or "checking," or "assigning," or "selecting," or "verifying," or "totaling" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display equipment.

Figure 1:
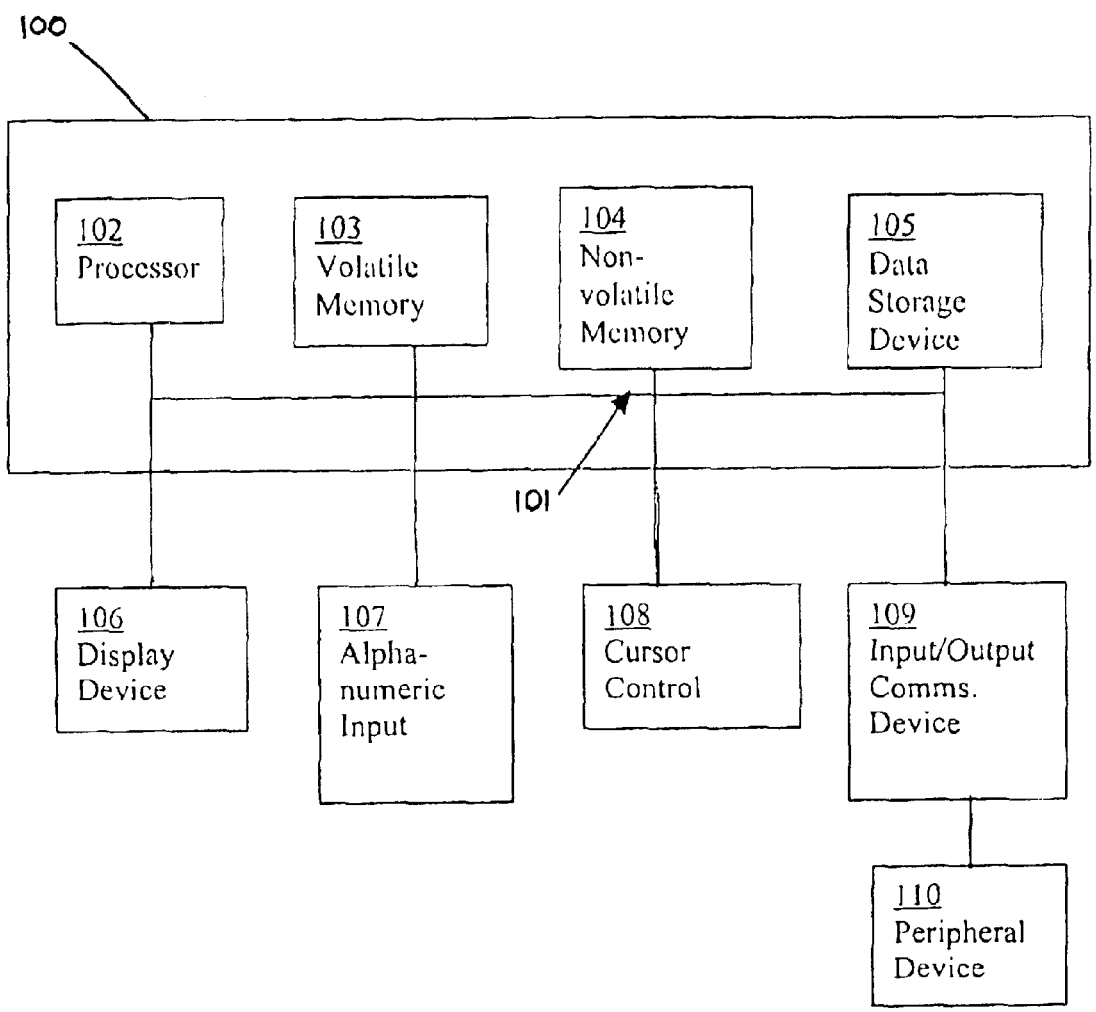
FIG. 1 is a block diagram of an exemplary computer system for calculating device metrics in accordance with one embodiment of the present invention.

Portions of the present invention comprise computer-readable and computer-executable instructions that reside, for example, in a computer system. An exemplary computer suitable for use with the present invention is shown in FIG. 1. This system 100 may be a part of a general purpose computer network (not shown), or may be a stand-alone computer system. It will be appreciated that computer system 100 is exemplary only and that the present invention can operate within other computer systems including general-purpose computer systems, embedded computer systems, laptop computer systems, hand-held computer systems, and stand-alone computer systems.

Referring to FIG. 1, computer system 100 includes an address/data bus 101 for conveying digital information between the various components, a central processor unit (CPU) 102 for processing the digital information and instructions, a volatile main memory 103 comprised of volatile random access memory (RAM) for storing the digital information and instructions, and a non-volatile read only memory (ROM) 104 for storing information and instructions of a more permanent nature. In addition, computer system 100 may also include a data storage device 105 (e.g., a magnetic, optical, floppy, or tape drive or the like) for storing data. It should be noted that the software program for supporting a resource pool in accordance with an embodiment of the present invention can be stored either in volatile memory 103, data storage device 105, or in an external storage device (not shown). Processor 102, volatile memory 103, non-volatile memory 104 and data storage device 105 are each coupled to bus 101.

Devices which are optionally coupled to computer system 100 include a display device 106 for displaying information to a computer user, an alpha-numeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown). Optional display device 106 of FIG. 1 may be a liquid crystal device, cathode ray tube, or other display device suitable for creating graphic images and alpha-numeric characters recognizable to a user. Display device 106, alpha-numeric input device 107, and cursor control device 108 are each coupled to bus 101.

Computer system 100 can include an input/output (I/O) signal unit (e.g., interface) 109 for interfacing with a peripheral device 110 (e.g., a computer network, modem, mass storage device, etc.). Accordingly, computer system 100 may be coupled in a network, such as a client/server environment, whereby a number of clients (e.g., personal computers, workstations, portable computers, minicomputers, terminals, etc.) are used to run processes for performing desired tasks (e.g., "acquiring," "qualifying," "calculating," or "checking," or "assigning," or "selecting," or "verifying," or "generating," etc.). In particular computer system 100 can be coupled in a system for executing a software application program that embodies aspects of the present invention. Input/output signal unit 109 is coupled to bus 101.

Figure 2:
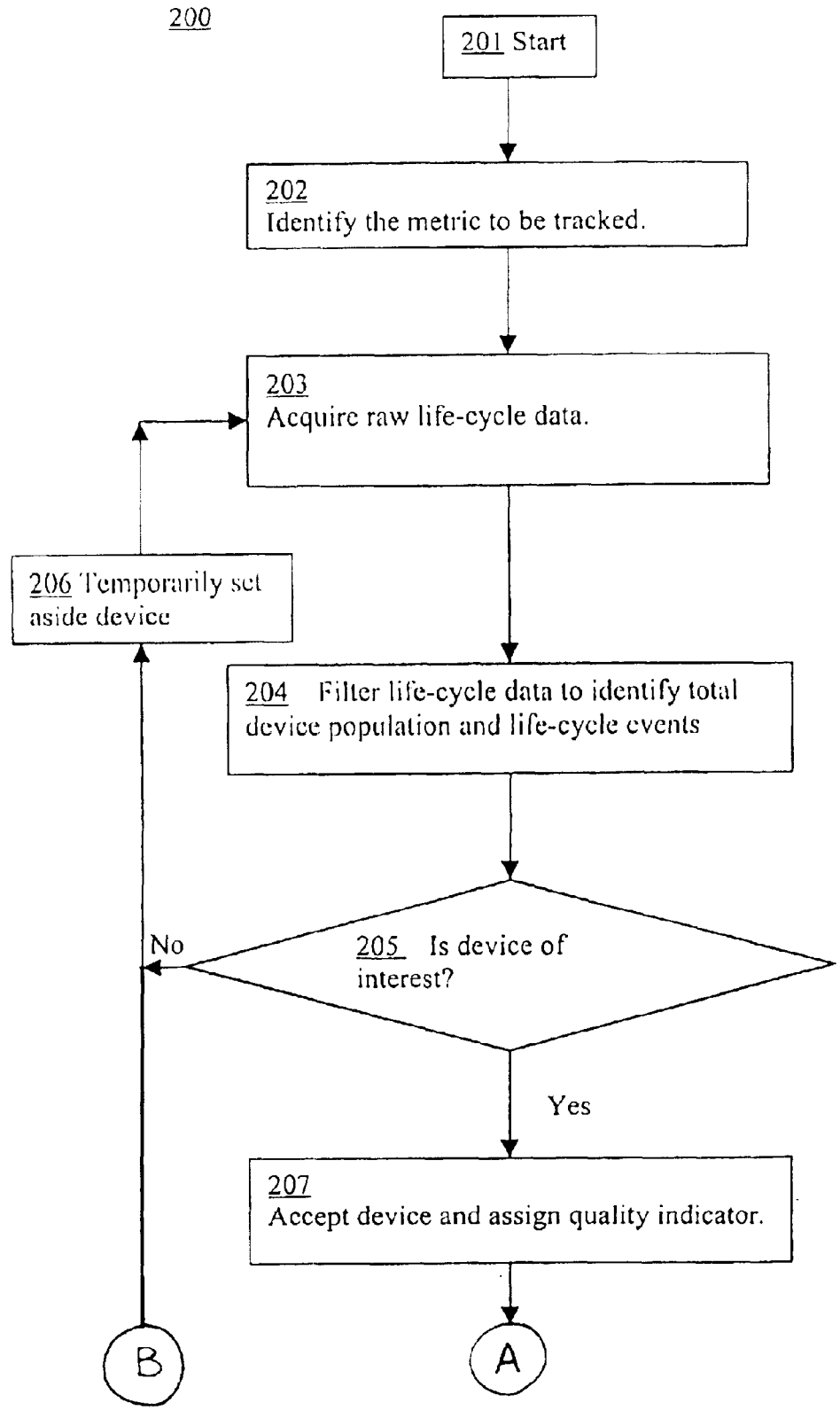
FIG. 2 is a flowchart of a method for calculating device metrics in accordance with one embodiment of the present invention.
Figure 2:
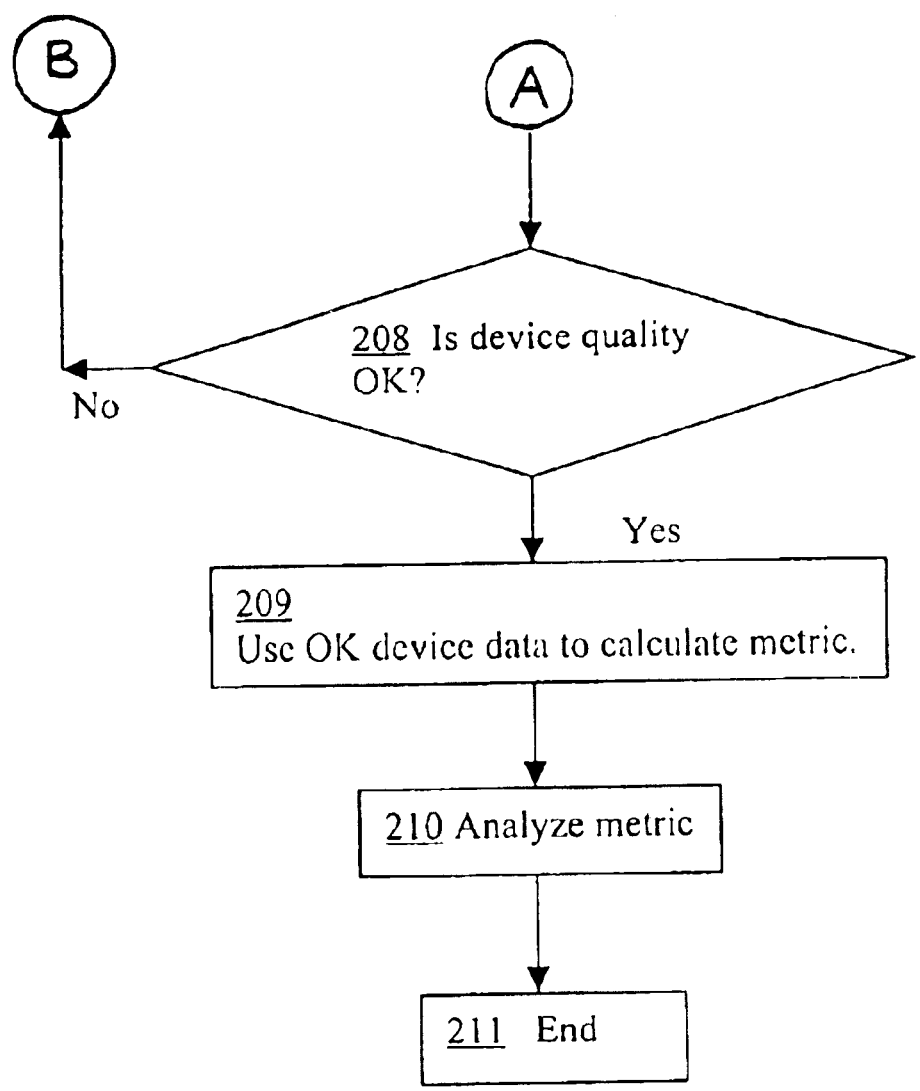

FIG. 2 shows a flowchart 200 of a method of calculating a device metric in accordance with an embodiment of the present invention. All of, or a portion of, the method depicted by flowchart 200 may be implemented using computer-readable and computer-executable instructions which reside, for example, in computer-usable media of a computer system or like device. In one embodiment, the steps of flowchart 200 can be implemented on the exemplary computer system 100 of FIG. 1. Accordingly, for the purpose of describing the present invention, the block diagram of FIG. 1 is used in conjunction with flowchart 200.

In FIG. 2, although specific steps of an embodiment of the present invention are set forth in flowchart 200, such steps are exemplary. That is, embodiments of the present invention can be performed by various other steps or steps equivalent to the steps set forth in flowchart 200. Also, the steps in flowchart 200 may be performed in an order different than presented, and not all of the steps in flowchart 200 may be performed.

Referring to FIG. 2, the method starts with steps 201 and 202 by identifying the metric to be calculated. Any metric pertaining to the device life-cycle can be calculated e.g., the device failure rate, defect rate, warranty claims, return rates and life expectancy and others.

Next, in step 203, life-cycle data is acquired for products of interest and events of interest. Life-cycle data can be acquired by conventional manual or automatic methods for any specified time period during the device life-cycle. For example, the data can be acquired daily, weekly, quarterly or at any other convenient time period. For reporting purposes, the data may be rolled up and reported, for example, by device model type and by shipment month and by operating week, month, quarter or year. Data sources include shipment records, device configuration records, and field service data.

Next, in step 204, product data is filtered to identify individual devices of interest and their associated event history.

In steps 205 and 206, devices that fail the filtering process will not qualify to contribute data to the metric calculations.

In step 207, data for qualified devices are assigned a quality data indicator to obtain a device data quality rating. An objective in assigning a quality code and obtaining a quality number is to ensure that only devices with the most complete and consistent data are included in the calculations, the assumption being that devices with the most complete and consistent data will likely yield the most accurate metric. An explanation of how the assignment is made and how the quality number is obtained is as follows:

Referring to Table 1, assume that it has been decided that, in calculating the failure rate for devices having a device Status Code value of Y for devices with quality indicator that indicate a specified level of quality, and N for devices that do not, it is necessary to acquire data for five life-cycle characteristics of a device: i.e., M manufacturing data); S (shipping data); I (field turn-on data); R (repair data); and V, (field service data).

In the "Device Data Quality Indicator" column in Table 1, if data is available for a characteristic, the characteristic is assigned a code of "1"; if no data is available, the characteristic is assigned a code of "0".

The presence and/or absence and consistency of specific life cycle events is used to determine a Device Data Quality Indicator which in turn determines the Device Data Quality Rating and the Device Status Code. Specific life cycle events must be present in the data to ensure that the device is in operation. For example, a shipment event and any field service event is assumed to be sufficient evidence that the device is in operation. In addition, the events must be consistent with each other in terms of timing relationships and event quantity. For example, an installation event cannot occur prior to a shipment event.

TABLE 1

Exemplary Assignment of Device Status Code for Qualified Devices

| Device Status Code | Device Data Quality Rating | Device Data Quality Indicator | # of Devices Qualified |
|---|---|---|---|
| Y | 5 | M1, S1, I1, R1, V1 | 363 |
| Y | 4 | M0, S1, I1, R1, V1 | 73 |
| Y | 4 | M1, S0, I1, R1, V1 | 15 |
| Y | 3 | M0, S0, I1, R1, V1 | 22 |
| Y | 2 | M0, S0, I1, R0, V1 | 243 |
| N | 1 | M0, S1, I0, R0, V0 | 10 |
| Y Total | | | 716 |
| Total Shipment | | | 1022 |
| % of Total Shipment | | | 70% |

In step 208, the device data quality indicator is used to determine which data should be included in the calculation. For example, if the device data quality rating exceeds a threshold value, e.g. 2, then the data for the device is accepted; if the device data quality rating is less than the threshold value, the data is temporarily excluded, in step 206, until clarifying data becomes available to bring the data into the calculation.

In step 209, qualified devices are accepted data and the metric is calculated by conventional mathematics.

In step 210, the metric can be analyzed by conventional statistical techniques and the results reported in conventional statistical control charts. For example, FIG. 3 is a conventional Quality Control Chart 300 depicting device failure rate 312 (Y-axis) as a function of device ship-month 310 (X-axis) for a failure rate metric calculated in accordance with an embodiment of the present invention, for devices in different classes. The method ends with step 211.

In FIG. 3, each data point 302 represents a class of devices having the same life-cycle characteristic, e.g. field operating hours in a specific life-cycle period, but different ship-months. The Center Line 306 is the average of the data points 302 for all the classes, and the Upper Control Limit line 304 (not shown) and the Lower Control Limit line 308 are statistically determined limits about the Center Line 306. In FIG. 3, the data points 302 can be updated as new information for each class is acquired. It should be noted that if new information becomes available for a data point 302, and the chart 300 is revised at a later date to include the new information, the location of the data point 302 with the new information can move up or down about the Center Line 306, depending on the extent of new information acquired. For a data point 302 with no new information, the location of the data point will not change.

The information provided by FIG. 3 can be used in a conventional manner to monitor device quality. For example, on each chart when a data point falls outside of the Control Limit Lines, that data point will be flagged for non-random behavior, the assumption being that if the manufacturing process is in statistical control, the failure rate reported by the device ship month should bounce around the Center Line in a random manner and remain within the control limits.

In summary, the present invention provides for a novel method and system for calculating device metrics with greater precision. This is achieved by subjecting device life-cycle data to a quality check to remove devices that have not passed a threshold sufficiency value. Accordingly, with the present invention better information is provided to control events in the device life-cycle.

Embodiments of the present invention are thus described. While the present invention has been described in particular embodiments, it should be appreciated that the present invention should not be construed as limited by such embodiments, but rather construed according to the following claims.

What is claimed is:

1. A method comprising:

acquiring life-cycle data for devices;

filtering said life-cycle data to identify devices of interest;

assigning a device data quality indicator to said life-cycle data associated with each of said devices of interest;

utilizing said device data quality indicator to determine a device data quality rating for each of said devices of interest; and utilizing said device data quality rating to determine which of said life-cycle data to include in calculating a device metric.

2. The method of claim 1, further comprising calculating a center-line value of said device metric for a plurality of devices of interest.

3. The method of claim 2, further comprising calculating an upper control limit value and a lower control limit value about said center-line value.

4. The method of claim 3, further comprising investigating metrics that are less than the lower control limit or more than the upper control limit value.

5. The method of claim 1, further comprising:

utilizing said device data quality rating to determine a device status code.

6. The method of claim 1, wherein said device metric is a device field failure rate.

7. The method of claim 1, wherein said life-cycle data comprises manufacturing data, configuration data, shipment data, field install data, field activity data, repair data, field service data, operating hours and field failures.

8. The method of claim 1, wherein said life-cycle data is acquired manually or automatically.

9. The method of claim 1, wherein said assigning said device data quality indicator is based on life-cycle data having completeness and consistency.

10. The method of claim 1, wherein said assigning said device data quality indicator comprises assigning a device data quality indicator value of 1 for life-cycle data that is available, and a device data quality indicator value of 0 for life-cycle data that is incomplete or inconsistent.

11. The method of claim 1, wherein said device metric is a defect rate, warranty claims, return rates, or life expectancy.

12. A computer system comprising a processor for executing a method comprising:

acquiring life-cycle data for devices;

filtering said life-cycle to identify devices of interest;

assigning a device data quality indicator to said life-cycle data associated with each of said devices of interest;

utilizing said device data quality indicator to determine a device data quality rating for each of said devices of interest; and utilizing said device data quality rating to determine which of said life-cycle data to include in calculating a device metric.

13. The computer system of claim 12, further comprising calculating a center-line value of said device metric for a plurality of devices of interest.

14. The computer system of claim 13, further comprising calculating an upper control limit value and a lower control limit value about said center-line value.

15. The computer system of claim 12, further comprising:

utilizing said device data quality rating to determine a device status code.

16. The computer system of claim 12, wherein said device metric is a device field failure rate, defect rate, warranty claims, return rates, or life expectancy.

17. The computer system of claim 12, wherein said life-cycle data comprises manufacturing data, configuration data, shipment data, field install data, field activity data, repair data, field service data, operating hours and field failures.

18. A computer-useable medium having computer readable code stored thereon for causing a computer system to perform a method comprising:

acquiring life-cycle data for devices;

filtering said life-cycle to identify devices of interest;

assigning a device data quality indicator to said life-cycle data associated with each of said devices of interest;

utilizing said device data quality indicator to determine a device data quality rating for each of said devices of interest; and utilizing said device data quality rating to determine which of said life-cycle data to include in calculating a device metric.

19. The computer-useable medium of claim 18, further comprising:

utilizing said device data quality rating to determine a device status code.

20. The computer-useable medium of claim 19, wherein said life-cycle data comprises manufacturing data, configuration data, shipment data, field install data, field activity data, repair data, field service data, operating hours and field failures.

21. The computer-useable medium of claim 18, wherein said device metric is a device field failure rate, defect rate, warranty claims, return rates, or life expectancy.

22. The computer-useable medium of claim 18, further comprising calculating a center-line value of said device metric for a plurality of devices of interest.

23. The computer-useable medium of claim 18, further comprising calculating an upper control limit value and a lower control limit value about said center-line value.

* * * * *